US012691028B2

(12) United States Patent
Pampaloni

(10) Patent No.: US 12,691,028 B2
(45) Date of Patent: Jul. 28, 2026

(54) INSTRUMENT FOR ASSISTED SOFT TISSUE MOBILIZATION

(71) Applicant: Enrico Pampaloni, Forte dei Marmi (IT)

(72) Inventor: Enrico Pampaloni, Forte dei Marmi (IT)

( * ) Notice: Subject to any disclaimer, the term of this patent is extended or adjusted under 35 U.S.C. 154(b) by 771 days.

(21) Appl. No.: 17/938,588

(22) Filed: Oct. 6, 2022

(65) Prior Publication Data

US 2023/0115657 A1 Apr. 13, 2023

(30) Foreign Application Priority Data

Oct. 7, 2021 (IT) ........................ 102021000025715

(51) Int. Cl.
*A61H 7/00* (2006.01)

(52) U.S. Cl.
CPC ..... *A61H 7/003* (2013.01); *A61H 2201/1695* (2013.01)

(58) Field of Classification Search
CPC .... A61H 7/001–003; A61H 2201/1253; A63B 23/16
See application file for complete search history.

(56) References Cited

U.S. PATENT DOCUMENTS 6,010,469 A * 1/2000 McAtee ................. A61H 7/003 601/138
2004/0249324 A1* 12/2004 Louis ..................... A61H 7/003 601/135
2005/0096572 A1* 5/2005 Hua ....................... A61H 7/003 601/135
2006/0293619 A1* 12/2006 Louis ..................... A61H 7/001 601/135
2014/0288473 A1* 9/2014 Matsushita ............ A61H 7/007 601/137
2014/0358045 A1* 12/2014 Toto ....................... A61H 7/003 601/18

(Continued)

FOREIGN PATENT DOCUMENTS

DE 202015008367 U1 3/2016
FR 2723844 A1 3/1996

(Continued)

OTHER PUBLICATIONS

Italian Search Report mailed Jun. 1, 2022 IT 202100025715 filed Oct. 7, 2021.

*Primary Examiner* — Joseph D. Boecker
*Assistant Examiner* — Thomas W Greig
(74) *Attorney, Agent, or Firm* — Vorys, Sater, Seymour and Pease LLP; Maryellen Feehery Hank; Anthony P. Venturino

(57) ABSTRACT

An instrument for assisted soft tissue mobilization including a graspable central core and defines a central axis, a sagittal plane perpendicular to the central axis, a longitudinal plane passing through the central axis and perpendicular to the sagittal plane, a first end spaced from the sagittal plane a second end opposite the first end with respect to the sagittal plane, and at least one arm protruding from one of the ends and defining a contouring configured to perform soft tissue mobilization, wherein the central core includes an ellipsoidal bulb configured to allow an operator to grasp the central core from different angles with respect to the central axis.

11 Claims, 5 Drawing Sheets

(56) References Cited

U.S. PATENT DOCUMENTS

| | | | | |
|---|---|---|---|---|
| 2019/0008716 | A1* | 1/2019 | Giddings | A61H 7/003 |
| 2021/0077349 | A1* | 3/2021 | Smith | A61H 15/00 |
| 2021/0361049 | A1* | 11/2021 | Brown | A45D 44/00 |

FOREIGN PATENT DOCUMENTS

| | | | | | |
|---|---|---|---|---|---|
| JP | H09108296 | A | | 4/1997 | |
| KR | 200365822 | Y1 | | 10/2004 | |
| WO | WO-0108628 | A1 | * | 2/2001 | A61H 39/04 |
| WO | 2005063163 | A2 | | 7/2005 | |
| WO | WO-2010131108 | A2 | * | 11/2010 | A61H 7/007 |
| WO | WO-2020243757 | A1 | * | 12/2020 | A61H 7/003 |

* cited by examiner

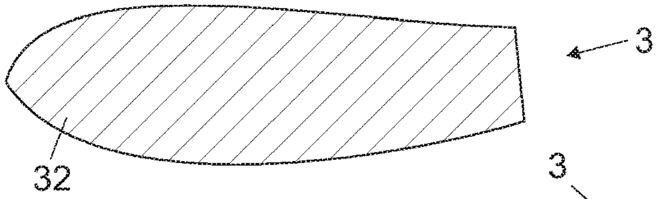
*Fig. 3a*
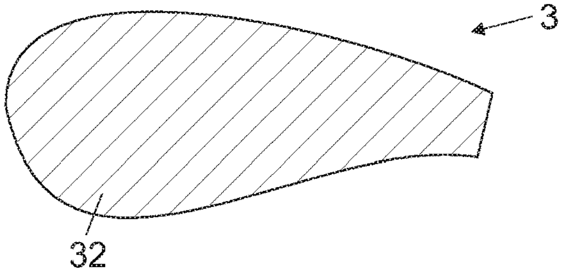
*Fig. 3d*
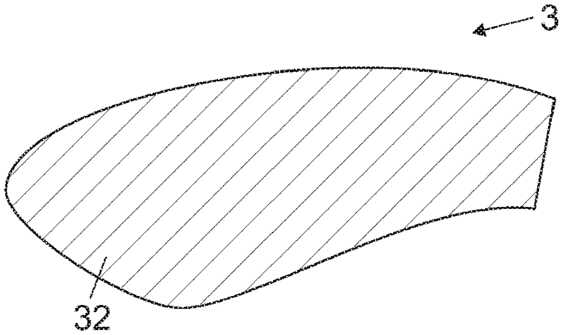
*Fig. 3f*
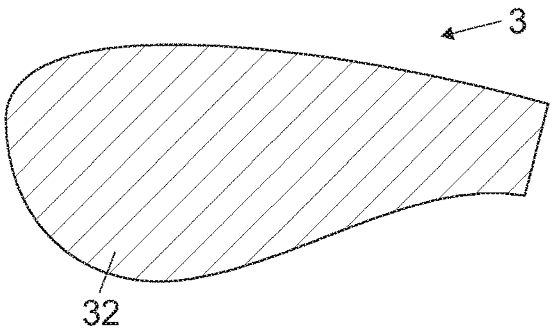
*Fig. 3h*
*Fig. 3b*
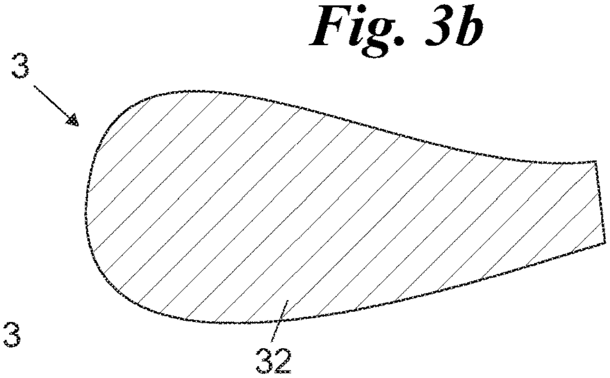
*Fig. 3c*
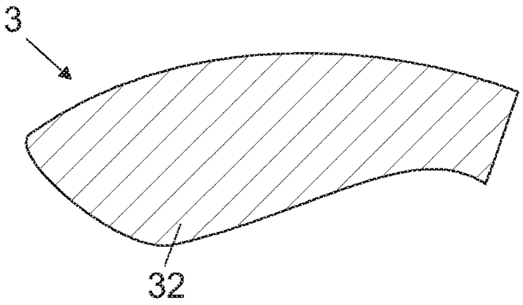
*Fig. 3e*
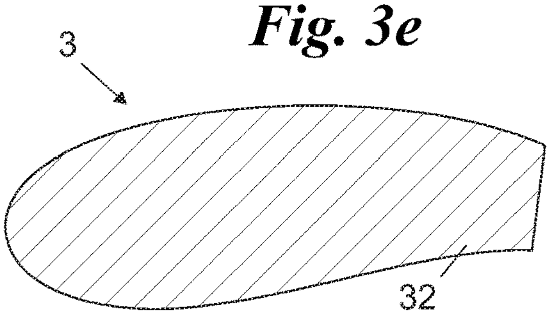
*Fig. 3g*
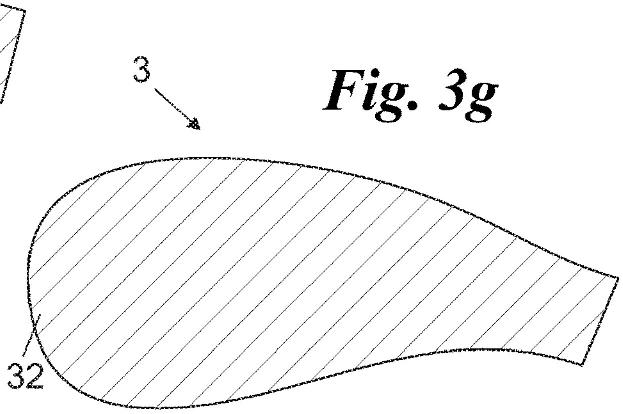

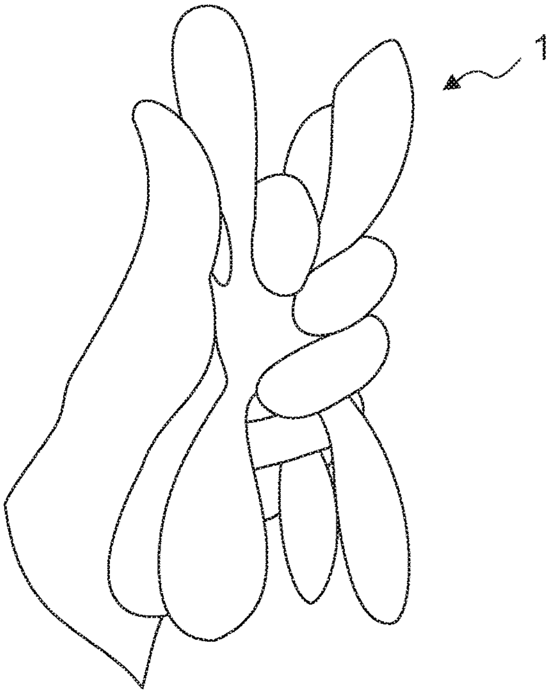
*Fig. 5a*
*Fig. 5b*
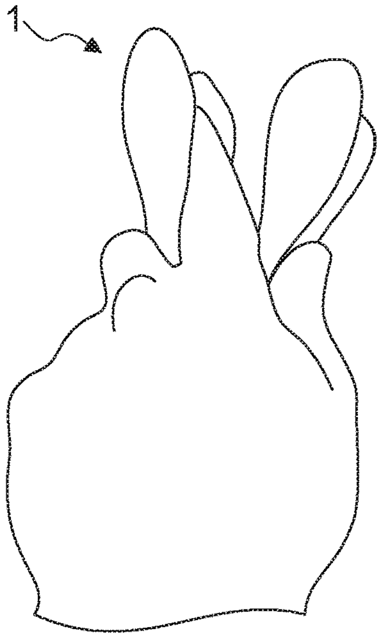
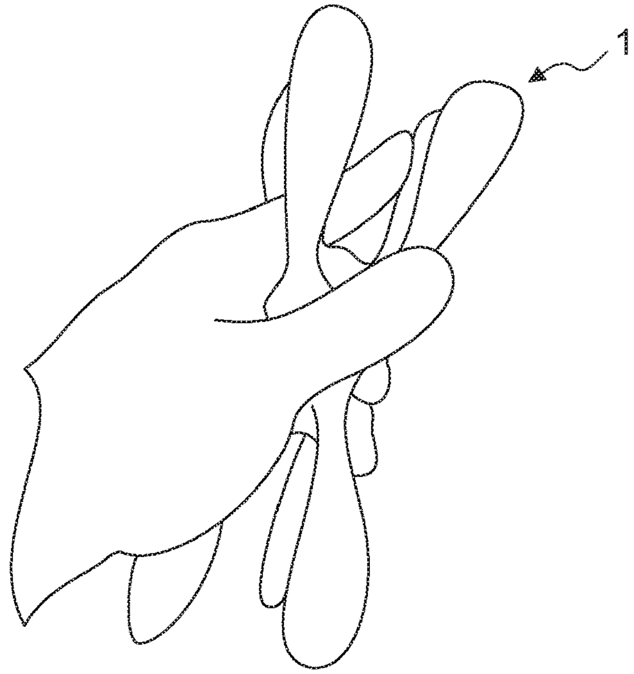
*Fig. 5c*
*Fig. 5d*
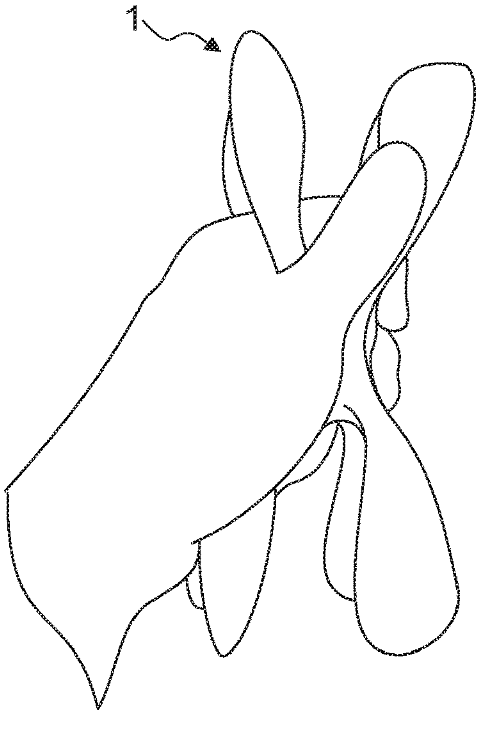

INSTRUMENT FOR ASSISTED SOFT TISSUE MOBILIZATION

FIELD OF THE INVENTION

The present invention relates to an instrument for assisted soft tissue mobilization of the type specified in the preamble to the first claim.

In particular, the present invention relates to an instrument for assisted soft tissue mobilization, i.e. belonging to the technical field known by the acronym IASTM (Instrument Assisted Soft Tissue Mobilization), useful for physiotherapy purposes with particular reference to myofascial therapy.

BACKGROUND OF THE INVENTION

The technique of assisted soft tissue mobilization, or IASTM, was developed at the end of the 20th century mainly for athletes.

Growing in popularity over the following years to the present day, it is used by massage therapists, chiropractors, osteopaths and physiotherapists mainly to help treat patients with myofascial restrictions that can cause pain and restrict movement.

Assisted soft tissue mobilization instruments are devices that are basically held by a skilled practitioner to massage all soft tissues, skin, muscles and fascia with the same instrument, i.e. without manual contact.

Many of these may vaguely resemble medieval torture instruments; in fact, some of the known IASTM instruments include blades, scrapers and sharp, pointed objects.

The aim of using these tools during IASTM is basically to help release soft tissue and myofascial restrictions to improve the way the user moves.

More specifically, the rubbing of the instrument is used to localise and release the tightness in the fascial system, i.e. the collagen coating that surrounds the muscles.

The known technique described includes some important drawbacks.

In particular, the instruments of the known technique only allow the operator to perform one function.

In addition, very often, such instruments are not very ergonomic, i.e. they are not easy to handle and may force the operator to perform uncomfortable torsions while working the myofascial restrictions that reduce their effectiveness.

In addition, some instruments may force the operator to have contact with the patient's skin, with the consequence that the therapeutic effects achievable with the instrument are dampened.

In conclusion, the instruments of the known technique hardly allow treatments on particularly large areas of the body.

SUMMARY OF THE INVENTION

In this situation, the technical task underlying the present invention is to devise an instrument for assisted soft tissue mobilization capable of substantially obviating at least part of the aforementioned drawbacks.

In the context of said technical task, it is an important aim of the invention to obtain an instrument for assisted soft tissue mobilizations which allows a plurality of functions by enabling the operator to carry out different operations on the myofascial restrictions of the user.

Furthermore, another important purpose of the invention is to achieve an instrument for assisted soft tissue mobilization that is extremely ergonomic and easy to handle, avoiding the need for the operator to perform unnatural movements.

A further aim of the invention is to realise an instrument for assisted soft tissue mobilization that allows maximising the effectiveness of the treatments performed with the instrument, especially by avoiding contact between the operator's hand and the user's body.

In conclusion, another task of the invention is to realise an instrument for the assisted soft tissue mobilizations which allows to work areas of the body of both limited extension and of great extension.

The specified technical task and purposes are achieved by an instrument for assisted soft tissue mobilization as claimed in the appended claim 1.

Preferred technical solutions are highlighted in the dependent claims.

BRIEF DESCRIPTION OF THE DRAWINGS

The features and advantages of the invention are hereinafter clarified by the detailed description of preferred embodiments of the invention, with reference to the appended drawings, in which:

the FIG. 1 shows a perspective view of an instrument for assisted soft tissue mobilization according to the invention;

Figure 1:
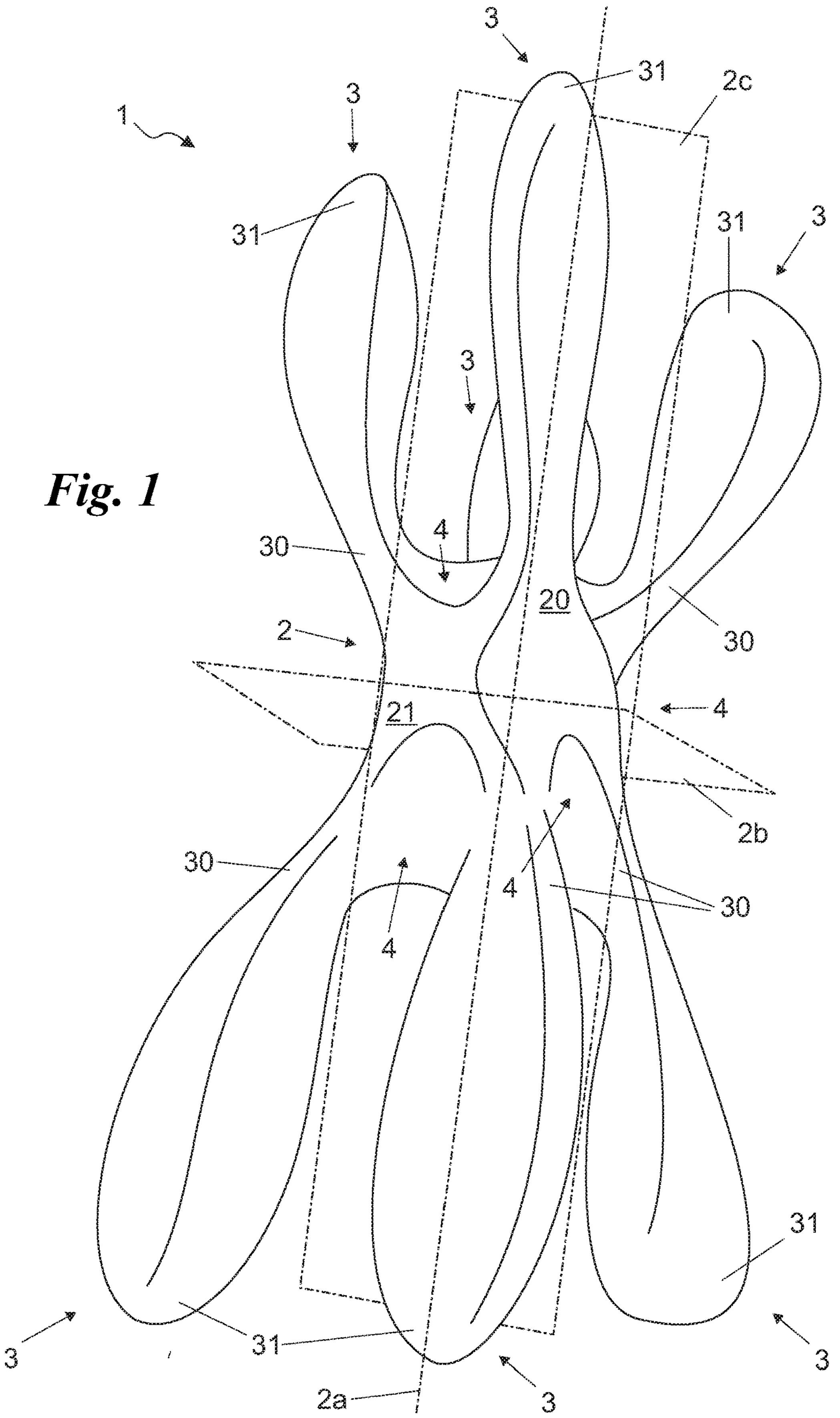
Figure 2A:
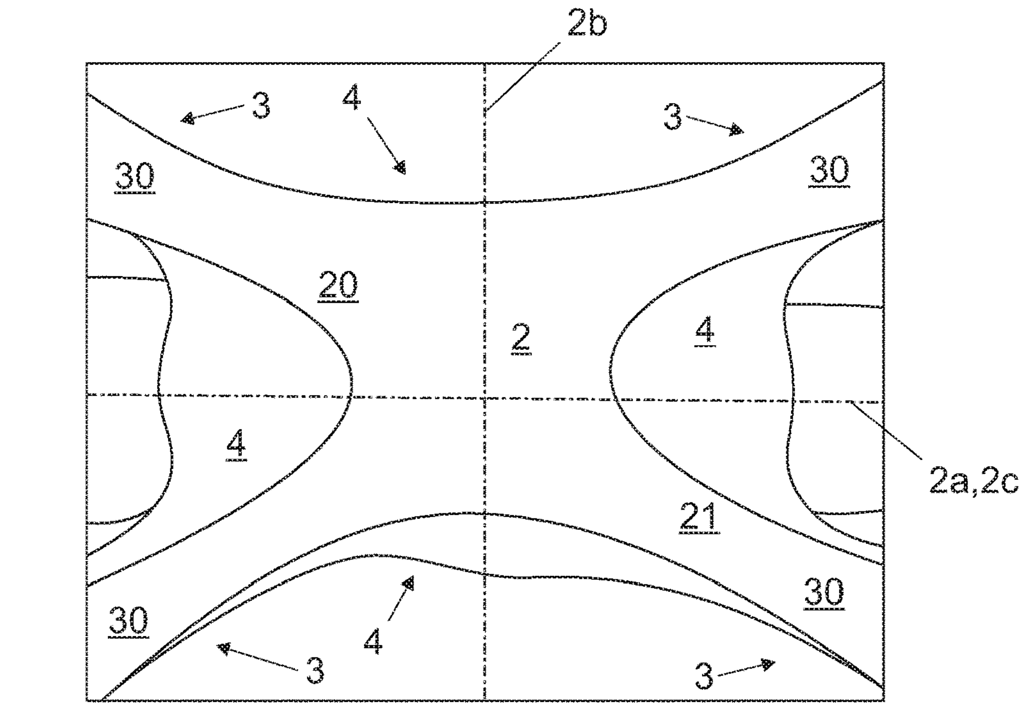
Figure 2B:
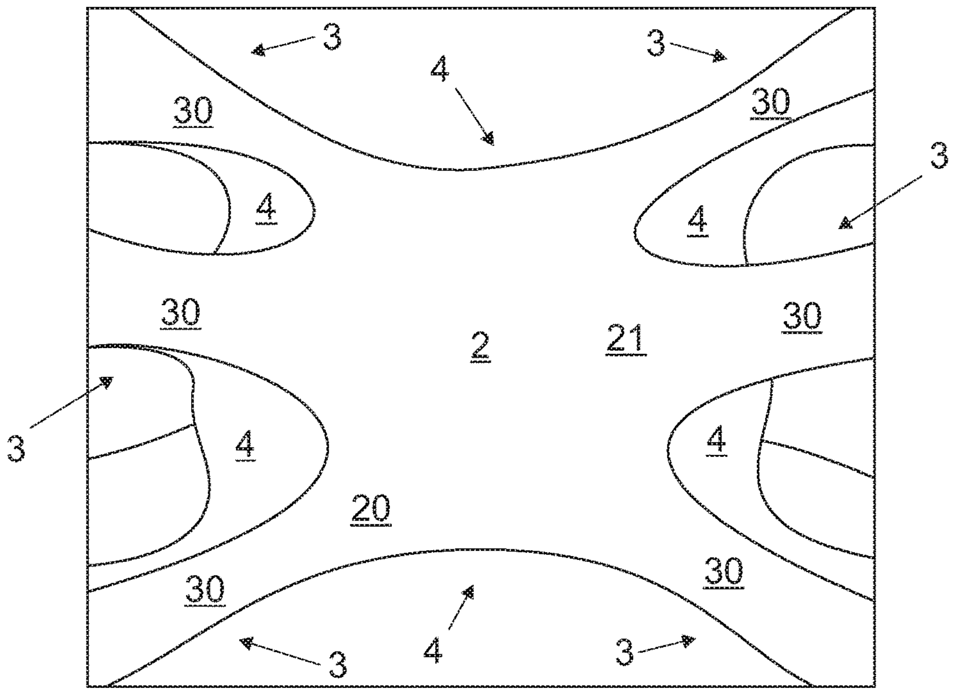
Figure 4:
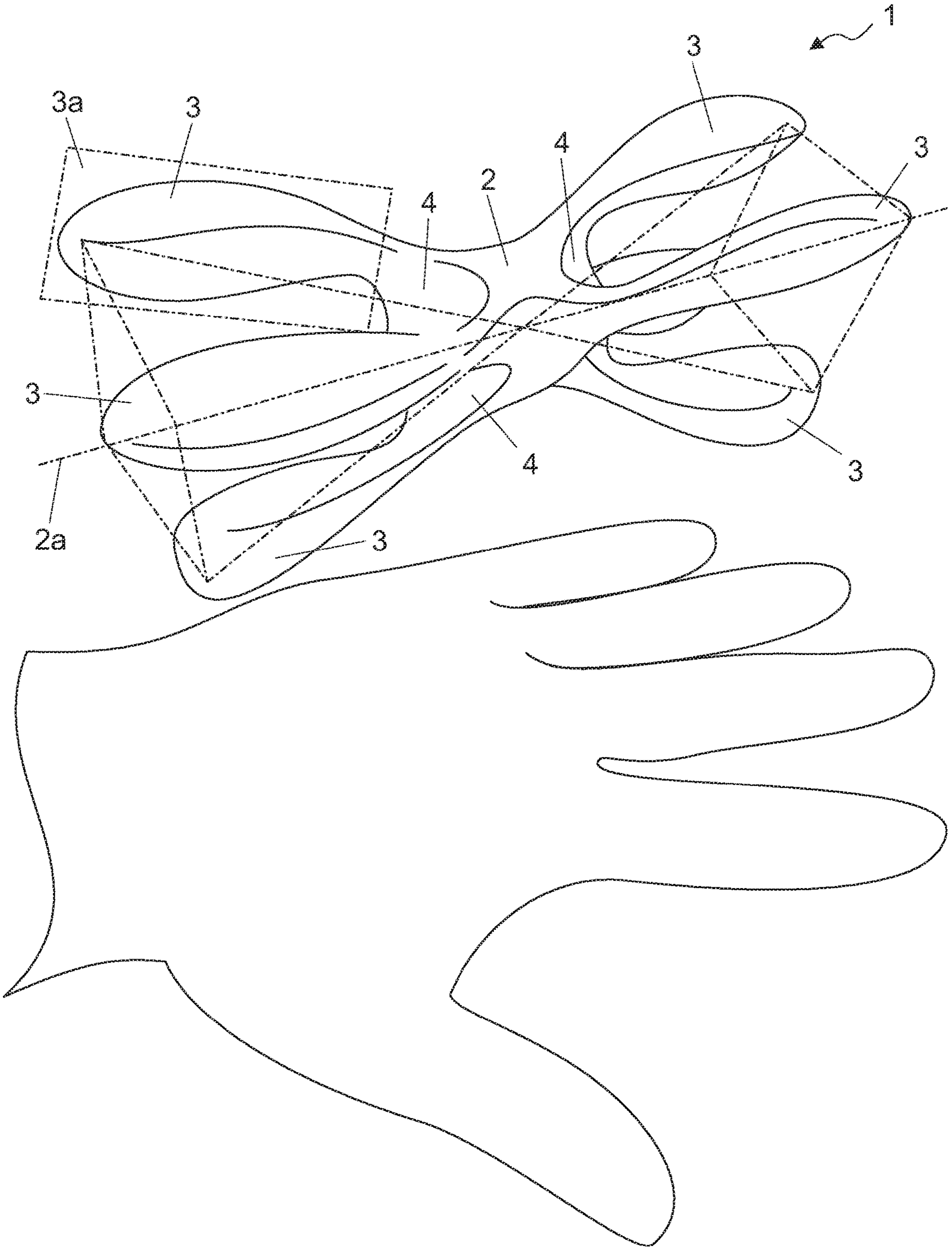

the FIG. 2*a* illustrates a front view detail of the central core of an instrument for assisted soft tissue mobilization according to the invention;

the FIG. 2*b* is a detail of the central core of FIG. 2*a* viewed from the side;

the FIG. 3*a* depicts a sectional view along the secondary plane of an arm in a first embodiment of an instrument for assisted soft tissue mobilization according to the invention;

the FIG. 3*b* illustrates a sectional view along the secondary plane of an arm in a second embodiment of an instrument for assisted soft tissue mobilization according to the invention;

the FIG. 3*c* illustrates a sectional view along the secondary plane of an arm in a third embodiment of an instrument for assisted soft tissue mobilization according to the invention;

the FIG. 3*d* is a sectional view along the secondary plane of an arm in a fourth embodiment of an instrument for assisted soft tissue mobilization according to the invention;

the FIG. 3*e* is a sectional view along the secondary plane of an arm in a fifth embodiment of an instrument for assisted soft tissue mobilization according to the invention;

the FIG. 3*f* illustrates a sectional view along the secondary plane of an arm in a sixth form of embodiment of an instrument for assisted soft tissue mobilization according to the invention;

the FIG. 3*g* illustrates a sectional view along the secondary plane of an arm in a seventh embodiment of an instrument for assisted soft tissue mobilization according to the invention;

the FIG. 3*h* is a sectional view along the secondary plane of an arm in an eighth embodiment of an instrument for assisted soft tissue mobilization according to the invention;

the FIG. 4 is a view an instrument for assisted soft tissue mobilization according to the invention compared with the dimensions of a common adult hand;

the FIG. 5*a* illustrates a first example of a handle of an instrument for assisted soft tissue mobilization according to the invention;

the FIG. 5*b* illustrates a second example of a handle of an instrument for assisted soft tissue mobilization according to the invention;

the FIG. 5*c* is a third example of a handle of an instrument for assisted soft tissue mobilization according to the invention; and the FIG. 5*d* is a fourth example of a handle of an instrument for assisted soft tissue mobilization according to the invention.

DETAILED DESCRIPTION

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer system, registers or other storage, transmission or information displaying devices.

The measurements and data reported in this text are to be considered, unless otherwise indicated, as performed in the International Standard Atmosphere ICAO (ISO 2533:1975).

With reference to the Figures, the instrument for assisted soft tissue mobilization according to the invention is globally referred to as number 1.

The instrument 1 is an instrument for enabling treatment of the body and, in particular, assisted soft tissue mobilization.

Accordingly, the instrument 1 comprises, in brief, at least a core 2 and an arm 3.

The core 2 is essentially a graspable part. Therefore, it defines the part capable of interacting directly with an operators hand.

Preferably, the core 2 defines at least one central axis 2*a*.

The central axis 2*a* is substantially the axis along which the core 2 is most developed. Preferably, the core 2 however also develops around the central axis 2*a*.

In fact, core 2 includes an ellipsoidal or chiasmatic bulb.

The ellipsoidal bulb is an element having a squat shape, which can be substantially assimilated to an ovoid element.

The central core 2, given its advantageous shape, is therefore configured to allow an operator to grip it from different angles with respect to the central axis 2*a*.

The central core 2 also defines a sagittal plane 2*b*.

The sagittal plane 2*b* is essentially a virtual plane perpendicular to the central axis 2*a*.

Thus, the sagittal plane 2*b* subdivides the central core 2 into two similar, but not necessarily identical portions, and may pass through the centre of gravity of the central core 2.

Thus, core 2 also defines a longitudinal plane 2*c*.

The longitudinal plane 2*c* is essentially passing through the central axis 2*a*. In addition, the longitudinal plane 2*c* is also perpendicular to the sagittal plane 2*c*.

Thus, the longitudinal plane 2*c* also subdivides the central core 2 into two similar, but not necessarily identical portions, and may pass through the centre of gravity of the central core 2.

In addition, core 2 defines two particular zones; in detail, core 2 defines a first end 20 and a second end 21.

The first end 20 is distanced from the sagittal plane 2*b*.

The second end 21 is substantially opposite the first end with respect to the sagittal plane 2*b*.

Preferably, the arm 3 protrudes from one of the ends 20, 21. Furthermore, the arm 3 defines a contouring configured to perform soft tissue mobilization.

Such contouring may be of a conventional type, i.e. similar to what is already present in common IASTM devices, or it may be particular, as further specified below.

Advantageously, the instrument 1 may also comprise a plurality of arms 3.

The arms 3 may be configured in different ways. For example, the instrument 1 may comprise a plurality of arms 3 protruding from at least one of the ends 20, 21.

Furthermore, the instrument 1 may also comprise at least one arm 3 protruding from the first end 20, and at least one arm 3 protruding from the second end 21. Of course, the instrument 1 may also comprise a plurality of arms 3 protruding from the first end 20, and a plurality of arms 3 protruding from the second end 21.

Each arm 3, in particular, preferably defines at least one shank 30 and one tip 31.

The shank 30 is substantially the portion of arm 3 adjacent to the central core 2. Therefore, preferably, the shank 30 is substantially the attachment portion between arm 3 and central core 2.

The tip 31 is, on the other hand, the distal portion of the arm 3 with respect to the central core 2. Thus, preferably, the tip 31 is suitable for contacting a body of a user.

More specifically still, preferably, each pair of shanks 30 and the respective end 20, 21, understood to be on which the shanks 30 are facing or attached, define a concavity 4.

The concavity 4 is essentially a cavity or dimple. Preferably, the concavity is configured to accommodate at least one finger of a hand of an adult person.

The concavity 4 between two shanks 30 of arms 3 protruding from the same end 20, 21 is preferably configured to accommodate at least part of a single finger.

Such a concavity 4 may be termed a trochlear concavity and allows direct use on the specific end 20, 21 minimising operator effort and maximising the beneficial effect and precision of use of the instrument 1.

The concavity between two shanks 30 of arms 3 on opposite ends 20, 21 is, on the other hand, preferably configured to accommodate a plurality of fingers or even part of a palm of a hand.

Such features are highlighted, in particular, in the FIGS. 5*a*-5*d*.

In addition to what has already been described, preferably, each arm 3, whether one or more in the instrument 1, protrudes from the central core 2 by diverging from the central axis 2*a*.

Furthermore, in preferred embodiments of the instrument 1, the instrument 1 preferably comprises at least three arms 3 at each end 20, 21.

These arms 3 also preferably diverge radially to the central axis 2*a*. Thus, overall, the instrument 1 defines a shape assimilable to an hourglass as shown, schematically, in FIG. 4.

Naturally, it is not necessary that on the ends 20, 21 the arms 3 are present in equal numbers. For example, the instrument 1 may comprise three arms 3 protruding from the first end 20 and four arms from the second end 21.

In the preferred embodiment, the instrument 1 comprises four arms 3 at each end 20, 21. Thus, the central core 2 defines for each end 20, 21 an ovo-quadripod shape. An ovo-quadripod is essentially an oval element combined with a quadripod element in which the legs are provided by the arms 3.

As mentioned above, the contouring of the arms 3 is configured to allow mobilization of the body's soft tissue. Thus, the arms 3 may define particular shapes.

Preferably, the arms 3 are globally rounded. Furthermore, each arm 3 preferably defines a main section 32.

The section 32 is essentially the section of the arm 2 along a secondary plane 3*a*.

The secondary plane 3*a* is substantially a midsection plane of the arm 3. Thus, the secondary plane 3*a* is a plane transverse to the sagittal plane 2*b* and the longitudinal plane 2*c*.

The section 32 defines, therefore, a shape of your choice between a rounded tip, as shown in FIG. 3*a*, a spatula, as shown in FIG. 3*b*, a drop, as shown in FIG. 3*c*, a straight thumb, as shown in FIG. 3*d*, a trapezoid, as shown in FIG. 3*e*, a rotated thumb, as shown in FIG. 3*f*, a medium bulb, as shown in FIG. 3*g* and a wedge-shaped bulb, as shown in FIG. 3*h*.

In particular, the blunt tip shape of FIG. 3*a* is substantially a tip shape or rounded tip awl referred to the fourth or fifth finger of the hand; the spatula shape of FIG. 3*b* is substantially a wide-radius scaphoid shape; the drop shape of FIG. 3*c* is a large condyle or major condyle shape; the straight-thumb shape of FIG. 3*d* is a shape referring to the first finger of the hand; the trapezoid shape of FIG. 3*e* is an interphalangeal shape close to the second finger in maximum flexion with divergent orientation; the rotated-thumb shape of FIG. 3*f* is a shape of the first finger with convergent end.

In the preferred form of realisation, i.e. the eight-armed form 3, the arms 3 define sections 32 having a rounded tip (FIG. 3*a*), spatula (FIG. 3*b*), drop (FIG. 3*c*), straight thumb (FIG. 3*d*), trapezoid (FIG. 3*e*), rotated thumb (FIG. 3*f*), medium bulb (FIG. 3*g*) and wedge-shaped bulb (FIG. 3*h*) form, respectively.

In this way, it is basically possible to carry out most of the treatments useful for mobilization.

In conclusion, preferably, the instrument 1 defines an overall extension along the main axis 2*a* similar to the extension of an adult person's outstretched hand.

Such dimensions allow instrument 1 to be particularly easy to handle.

The operation of instrument 1 for assisted soft tissue mobilization described above in structural terms is as follows.

Basically, the instrument 1 can be gripped in different ways to carry out different treatments using the different arms 3.

In detail, both the shape of the central core 2 and the conformation of the concavities 4, which are at least four among the arms 3 protruding from a single end 20, 21 of the preferred embodiment form, allow the instrument 1 to be gripped from different angles, with respect to the central axis 2*a*, in order to effectively manipulate a user's body.

The instrument 1 for assisted soft tissue mobilization according to the invention achieves important advantages.

Indeed, the instrument 1 for assisted soft tissue mobilization allows a plurality of functions, defined by the different arms 3 with different sections 32 and contours, allowing the operator to perform different workings on the myofascial restrictions of the user.

Furthermore, the instrument 1 for assisted soft tissue mobilization is extremely ergonomic and easy to handle, preventing the operator from having to make unnatural movements.

Thus, Instrument 1 for assisted soft-tissue mobilization maximises the effectiveness of the treatments performed with Instrument 1 by avoiding contact between the operators hand and the users body.

In conclusion, the instrument 1 for the assisted soft tissue mobilizations makes it possible to work areas of the body both of limited extension and of great extension, since it is possible, for example, to simultaneously use both the arms 3 protruding from the same end 20, 21, and the arms 3 protruding from different ends 20, 21 by simply changing the orientation of the handle.

The invention is susceptible to variations within the scope of the inventive concept as defined by the claims.

Within this scope, all details are substitutable by equivalent elements and the materials, shapes and dimensions can be any.

The invention claimed is:

1. An instrument for assisted soft tissue mobilization comprising:
- a graspable central core and defined:
- a central axis,
- a sagittal plane perpendicular to said central axis,
- a longitudinal plane passing through said central axis and perpendicular to said sagittal plane,
- a first end spaced from said sagittal plane,
- a second end opposite to said first end with respect to said sagittal plane, and
- at least one arm protruding from one of said ends and defining a contouring configured to achieve said mobilization of soft tissues,
- and
- wherein said central core includes an ellipsoidal bulb configured to allow an operator to grip said central core from different angles with respect to said central axis,
- wherein each said arm protrudes from said central core diverging with respect to said central axis,
- wherein said arms are at least three in number for each end, diverge radially to said central axis and said instrument defines an hourglass shape.

2. The instrument according to claim 1, comprising a plurality of said arms protruding from at least one of said ends.

3. The instrument according to claim 1, comprising at least one said arm protruding from said first end and at least one said arm protruding from said second end.

4. The instrument according to claim 2, wherein each said arm defines a shank adjacent to said central core and a distal tip respect to said central core and adapted to contact a body of a user and in which a concavity configured to house at least one finger of a hand of an adult person.

5. The instrument according to claim 1, wherein said arms are four in number for each end and said central core defines for each said end an ovo-quadripod shape.

6. The instrument according to claim 1, wherein said at least one arm defines a main section along a secondary plane transverse to said sagittal plane and said longitudinal plane defining a shape chosen from a rounded tip, a spatula, a drop, a straight thumb, a trapezium, a rotated thumb, a medium bulb and a wedge-shaped bulb.

7. The instrument according to claim 5, wherein said arms define a section defining respectively a rounded tip, a spatula, a drop shape, with a straight thumb, with a trapezium, with a rotated thumb, with a medium bulb and with a wedge-shaped bulb.

8. The instrument according to claim 1, defining a total extension along said main axis similar to an outstretched hand of an adult person.

9. The instrument according to claim 1, comprising at least one said arm protruding from said first end and at least one said arm protruding from said second end.

10. The instrument according to claim 3, wherein each said arm defines a shank adjacent to said central core and a distal tip respect to said central core and adapted to contact a body of a user and in which a concavity configured to house at least one finger of a hand of an adult person.

11. An instrument for assisted soft tissue mobilization comprising:

a graspable central core and defined:

a central axis, a sagittal plane perpendicular to said central axis, a longitudinal plane passing through said central axis and perpendicular to said sagittal plane, a first end spaced from said sagittal plane, a second end opposite to said first end with respect to said sagittal plane, and at least one arm protruding from one of said ends and defining a contouring configured to achieve said mobilization of soft tissues, and wherein said central core includes an ellipsoidal bulb configured to allow an operator to grip said central core from different angles with respect to said central axis, wherein said at least one arm defines a main section along a secondary plane transverse to said sagittal plane and said longitudinal plane defining a shape chosen from a rounded tip, a spatula, a drop, a straight thumb, a trapezium, a rotated thumb, a medium bulb and a wedge-shaped bulb, wherein said at least one arm comprises 8 arms defining a section defining respectively said rounded tip, said spatula, said drop shape, with said straight thumb, with said trapezium, with said rotated thumb, with said medium bulb and with said wedge-shaped bulb.

* * * * *